United States Patent [19]

Schwarz et al.

[11] Patent Number: 5,081,830

[45] Date of Patent: Jan. 21, 1992

[54] METHOD OF RESTORING EXHAUST GAS TEMPERATURE MARGIN IN A GAS TURBINE ENGINE

[75] Inventors: Frederick M. Schwarz; Clifton J. Crawley, Jr., both of Glastonbury; Anthony F. Rauseo, Middletown, all of Conn.

[73] Assignee: United Technologies Corporation, Hartford, Conn.

[21] Appl. No.: 529,088

[22] Filed: May 25, 1990

[51] Int. Cl.$^5$ .............................................. F02C 7/12
[52] U.S. Cl. ................................. 60/39.02; 60/39.75
[58] Field of Search ............ 60/39.02, 39.24, 39.29, 60/39.75, 204; 415/115, 116, 175, 178

[56] References Cited

U.S. PATENT DOCUMENTS

| 4,019,320 | 4/1977 | Redinger et al. | 60/226.1 |
| 4,069,662 | 1/1978 | Redinger et al. | 60/226.1 |
| 4,304,093 | 12/1981 | Schulze | 60/39.29 |
| 4,849,895 | 7/1989 | Kervistin | 60/39.75 |
| 4,856,272 | 8/1989 | Putman et al. | 60/39.02 |
| 4,999,991 | 3/1991 | Haddad et al. | 60/39.02 |

Primary Examiner—Louis J. Casaregola

[57] ABSTRACT

The present invention discloses a method of restoring exhaust gas temperature (EGT) margin in a gas turbine engine equipped with a modulating valve and other hardware for shrinking the turbine case relative to the turbine rotors. The method involves increasing the minimum flow area of the modulating valve at all engine operating conditions after the engine experiences some wear and operational deterioration, thereby providing additional cooling flow at take-off and climb conditions to restore both turbine efficiency and EGT margin.

15 Claims, 1 Drawing Sheet

METHOD OF RESTORING EXHAUST GAS TEMPERATURE MARGIN IN A GAS TURBINE ENGINE

DESCRIPTION

1. Technical Field

The present invention relates to gas turbine engines, and particularly to exhaust gas temperature margin in a gas turbine engine.

2. Background Art

One of the major expenses for commercial carriers operating gas turbine engine powered aircraft is the cost associated with having to overhaul the engines. These costs include both the direct costs, for parts and labor, to actually perform the overhaul, and the indirect costs, such as lost revenues, which occur as a result of having to pull the engine from service. Consequently, gas turbine engine manufacturers are continually seeking new ways to increase the useful life of the engine components.

On a gas turbine engine, the turbine inlet temperature of the combustor gas generally increases as the accumulated usage of the engine increases. As the turbine inlet temperature approaches the maximum allowable turbine inlet temperature of the turbine blades and seals, the deterioration rates thereof increase significantly. Consequently, one goal of gas turbine engine manufacturers is to maintain a certain temperature margin between the turbine inlet temperature and the maximum allowable turbine inlet temperature.

One method of determining the turbine inlet temperature involves measuring the exhaust gas temperature (EGT) of the engine. Since the EGT is thermodynamically related to the temperature of the combustor gas entering the turbine section, measuring the EGT allows the gas temperature at the turbine inlet to be determined. Likewise, the maximum allowable turbine inlet temperature corresponds to a maximum allowable EGT. The amount by which the maximum allowable EGT exceeds the EGT is referred to as EGT margin. It should be apparent from the above discussion that as the EGT margin decreases, the rate at which the turbine blades and seals deteriorate increases.

Often, reduction in EGT margin can be attributed to excessive clearance between the turbine blade tips and the surrounding nonrotating annular seal. This excessive clearance increases the leakage of the working fluid of the engine across individual rotor stages of the turbine section, thereby reducing overall engine efficiency. Consequently, more fuel must be combusted to produce the same amount of thrust, increasing the temperature of the combustor gas and reducing EGT margin.

One effective method of reducing excessive clearance between turbine blade tips and seals, termed "active clearance control", recognizes that a principle source of excessive blade tip/seal clearance is the differential thermal growth of the turbine rotor and the surrounding engine casing which supports the annular seal ring. Active clearance control, as disclosed in U.S. Pat. No. 4,069,662, uses a modulated flow of cool air derived from the engine bypass airflow stream and exhausted adjacent the high pressure turbine casing to shrink the casing relative to the high pressure turbine blade tips during steady state, high altitude cruise conditions. By providing such a modulated flow of cool air, active clearance control allows the engine to operate with minimum seal clearance for the majority of its operating cycle.

Although a major advance in the art of seal effectiveness and efficient gas turbine engine operation, active clearance control is operational only at steady-state engine conditions, such as high altitude cruise, due in part to concern that over-compensation for blade tip/seal clearance during transient conditions could cause interference or abrasion between the turbine blade tips and the annular seal. Consequently, engines equipped with active clearance control are still subject to excessive turbine blade tip/seal clearance during transients such as takeoff and climb when the active clearance control is shut off. This excessive clearance increases EGT, reducing EGT margin and increasing the deterioration rates of the turbine blades and seals.

DISCLOSURE OF THE INVENTION

It is therefore an object of the present invention to provide a method for restoring EGT margin in a gas turbine engine.

Another object of the present invention is to provide a method for restoring EGT margin which may be implemented between scheduled periodic replacement of the blade tips and or annular seal.

Another object of the present invention is to provide for an EGT retention method which may be implemented during scheduled service of a gas turbine engine in the field, and which does not require highly accurate measurement of the current blade tip/seal clearance in a particular engine.

Another object of the present invention is to provide a method, based upon the indicated EGT of the engine at takeoff or climb, which establishes the EGT margin remaining for a particular engine.

According to the present invention, a method for reducing EGT at takeoff and climb conditions is provided for a gas turbine engine. The method establishes a minimum cooling air flow rate to the active clearance control cooling system at takeoff and climb as well as all other engine operating conditions. Such minimum cooling airflow is established by determining the minimum cooling airflow required to increase EGT margin by a desired amount. The method provides for altering the minimum cooling air flow rate based on a measured EGT, a predicted EGT based on data from a plurality of engines similar to the one being altered, or both.

Specifically, the method is applicable to a gas turbine engine wherein a flow of cooling gas, independent of the engine working fluid, is delivered adjacent a portion of the engine structure for influencing the clearance between the rotating blade tips and the surrounding annular seal. The temperature of the delivered air is significantly cooler from the equilibrium temperature of the engine portion and the flow rate of the gas is modulated based upon current engine operating conditions. The delivered gas thus cools the engine portion, causing thermal contraction of the structure as required to maintain optimum tip clearance over the engine operating range. As used hereinafter, the term "engine operating condition" refers to engine operation at runway idle, takeoff, climb, cruise, or flight idle, as well as any transient condition between the aforementioned conditions.

The method according to the present invention reduces the blade tip clearances resulting from extended engine operation following the most recent seal overhaul by incrementally changing the minimum gas flow rate based on an engine operation indicator. That engine operation indicator is preferably EGT measured during the operation of the aircraft, and an EGT predicted by establishing schedules of the reduction in EGT margin relative to accumulated engine usage for a plurality of similar engines. Once the engine operation indicator reaches a preselected minimum, a particular engine's EGT margin is restored by increasing the minimum gas flow rate an amount sufficient to shrink the appropriate engine structure by an amount equivalent to the predicted amount of excessive seal clearance at takeoff, climb or other engine operating condition.

Even more specifically, for a gas turbine engine active clearance control system wherein a modulated flow of relatively cool fan or bypass air is directed so as to impinge on the exterior of the high pressure turbine casing so as to reduce the diameter thereof, the present invention provides a method for restoring EGT margin by increasing the minimum gas flow at least once between scheduled seal overhauls. The increased minimum gas flow reduces EGT at all engine operating conditions, and particularly at takeoff and climb, by substantially restoring turbine efficiency to the level in existence immediately after the most recent seal overhaul.

The present invention provides reduced EGT margin without complicated field measurements, the only individual engine analysis being measured EGT, a parameter which is presently monitored during normal aircraft usage. By adjusting the minimum gas flow rate in each engine at one or more interim periods between seal overhauls, preferably corresponding to other scheduled engine maintenance, the method according to the present invention extends the useful life of turbine components by restoring EGT margin.

These and other objects and advantages of the method according to the present invention will be apparent to those skilled in the art upon review of the following specification and the appended claims and drawing figures.

BEST MODE FOR CARRYING OUT THE INVENTION

Figure 1:
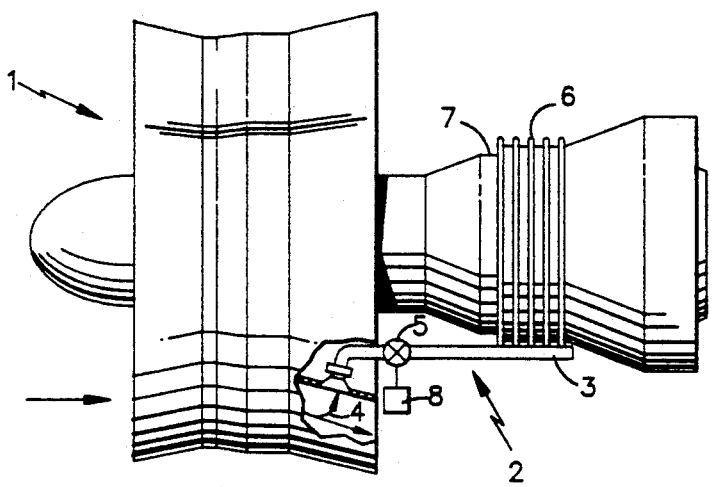
FIG. 1 shows a schematic representation of a typical turbofan gas turbine engine having an active clearance control.

Referring to FIG. 1, a gas turbine engine 1 is provided with an active clearance control system 2 having a conduit 3 for conducting a flow of relatively cool gas 4, such as the bypass or fan air through a modulating valve 5 and into one or more discharge manifolds 6 disposed circumferentially about the engine high pressure turbine section 7. The cool air 4 discharged from the manifolds 6 impinges on the turbine case 7, shrinking the turbine case 7 radially, depending upon the flow rate of the relatively cool gas 4, thereby reducing the blade tip clearance in the engine.

As discussed above, the flow rate of the cool gas 4 is modulated by a control system 8 responsive to current engine operating parameters such as the power level, barometric pressure, altitude, etc. An active clearance control as shown in FIG. 1 functions only during engine operation at high altitude cruise conditions to shrink the turbine casing 7 such that the clearance between the rotating turbine blade tips and the surrounding, case mounted, annular seal is at a practical minimum. The modulating valve 5 reduces the flow of cooling air 4 during engine transient operation, allowing the case 7 to assume a hotter, equilibrium temperature which opens the clearance between the blade tip and annular seal for avoiding interference and premature seal wear during such transient operation. That such open seals incur penalties in specific fuel consumption is well known, but acceptable due both to the relatively short portion of the engine operating cycle for such transient operation and the significant reduction in premature seal wear achieved. However, when excessive blade tip/seal clearances cause the EGT to approach the maximum allowable EGT, the excessive EGT becomes a more important consideration than avoiding interference and premature seal wear during transient operations.

Figure 2:
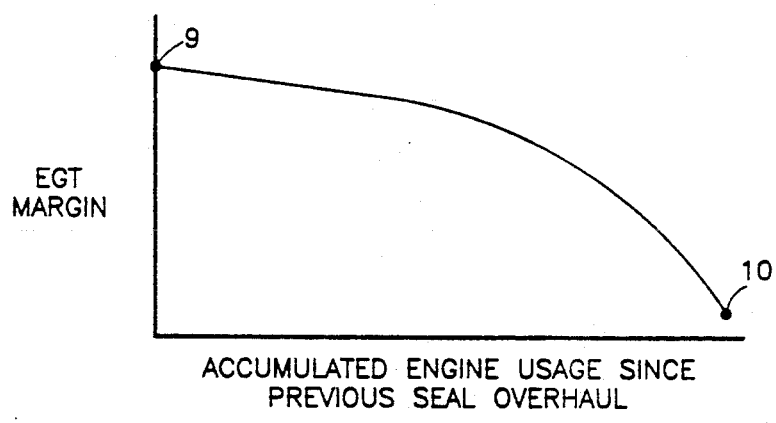
FIG. 2 shows shows a graphical representation of the change in average EGT margin plotted against accumulated engine usage.

All gas turbine engines, including those equipped with active clearance control, experience decreasing EGT margin as engine usage since the previous overhaul is accumulated. FIG. 2 shows a graphical representation of the change in average EGT margin plotted against accumulated engine usage. At zero engine usage 9, immediately after a seal overhaul, the average EGT margin is at a maximum. As engine usage accumulates, the average EGT margin deteriorates, eventually reaching a point 10 which justifies a seal overhaul, resulting in a restoration of average EGT margin to a level approximately equal to that immediately after the previous seal overhaul.

For the purpose of this discussion, a "seal overhaul" is defined as repair or replacement of the blade tips and/or annular seals, effectively resulting in a new combination of sealing elements within the gas turbine engine. The term "accumulated engine usage" is used herein to refer to an engine wear parameter responsive to one or more operation-related values such as the total accumulated hours of engine running time, and/or total engine flight cycles since the last seal overhaul. Of the named values, the number of flight cycles, including periods of runway idle, takeoff, climb, cruise, flight idle, and taxi, for example, is preferred as being most related to the rate of blade tip seal clearance deterioration.

The method according to the present invention recognizes the relationship between reduction in EGT margin and deterioration of blade tip/seal clearance, and corrects such deterioration by utilizing the hardware of the active clearance control to establish an increased minimum cooling gas flow rate at least once between sequential seal overhauls. Depending upon the particular model of engine, clearance deterioration, and other factors, the minimum cooling gas flow may be further increased to again reduce the clearance between the blade tip and the annular seal during takeoff and climb, thereby increasing EGT margin at those conditions.

Figure 3:
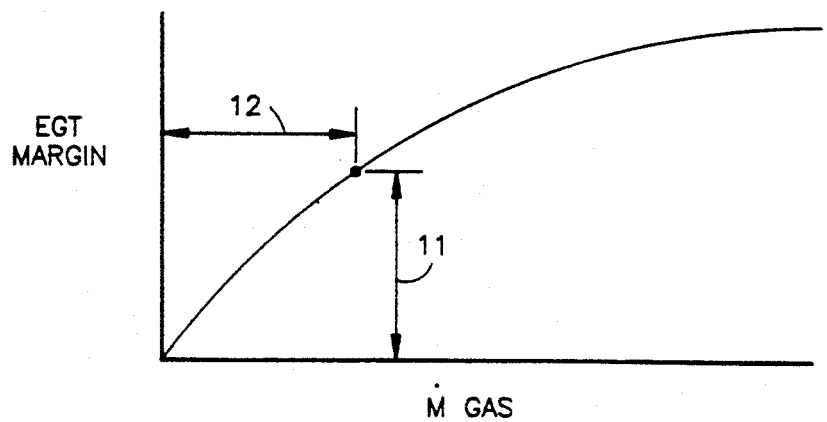
FIG. 3 shows a graphical representation of the increase in EGT margin in response to changing mass flow of the cooling gas.

The amount of increase in the minimum cooling air flow is derived from test measurement of the increase in EGT margin in response to changing mass flow of the cooling gas, as shown in FIG. 3. Thus, for a desired increase in EGT margin, the increase in mass flow rate of cooling gas required to produce that increase can be readily determined. Since the mass flow rate of the cooling gas in an active clearance control is a function of the flow area of the modulating valve, those skilled in the art will appreciate that by properly sizing the minimum flow area of the modulating valve 5, the desired increase 11 in EGT margin can be obtained.

Once the desired minimum gas flow area of the modulating valve 5 is determined, that flow area may be achieved by various means. For example, the modulating valve 5 of a typical active clearance control 2 may be physically altered to provide a minimum flow area at all engine operating conditions. This could be accomplished by boring holes through the valve flapper, or by grinding the outer diameter of the flapper so that it fails to fully seat against the seat of the modulating valve 5, either of which could provide the desired minimum flow area. Alternatively, a stop could be added to the valve to prevent the valve flapper from moving to any position which would provide less than the desired minimum flow area.

Another means of obtaining the desired minimum flow area is by modifying the logic of the active clearance control 2 to prevent the control system 8 from requesting any modulating valve 5 flapper position which would provide less than the desired minimum flow area. By modifying the logic of the control 8, the minimum flow area of the modulating valve 5 can be increased without the need to physically alter the modulating valve 5. In addition, the logic of the control 8 can be modified to automatically increase the minimum flow area of the modulating valve 5 in response to decreasing EGT margin, thereby eliminating the need for maintenance time to alter the modulating valve 5.

As discussed above, the method of the present invention uses indicated EGT, both actual EGT and predicted EGT, to determine when an increase in the minimum flow area of the modulating valve 5 is required. Since actual EGT is typically monitored on most gas turbine powered aircraft, using actual EGT allows precise determination of when the EGT exceeds the maximum allowable EGT. However, relying solely on actual EGT may require pulling the engine from service at a time other than regularly scheduled maintenance to increase the minimum flow area of the modulating valve 5, thereby adding to the operating cost of the engine.

The predicted EGT is obtained by collecting data on actual EGT at various levels of accumulated engine cycles for a plurality of similar gas turbine engines. Once such data has been collected, schedules of EGT margin loss in response to accumulated engine usage are established, and the average number of accumulated engine cycles at which EGT margin drops to zero is determined. Thus, for a particular one of the plurality of similar engines, the approximate number of accumulated engine cycles at which the minimum flow area of the modulating valve 5 must be increased can be predicted.

Once a predicted EGT margin schedule is established, the method of the present invention provides for monitoring accumulated engine cycles for a particular engine similar to those on which the schedule is based. As those skilled in the art will appreciate, EGT margins in similar engines may deteriorate at different rates. For example, an engine which is used on runways on which sand is frequently spread for traction will typically experience an EGT margin deterioration rate in excess of that of a similar engine which is operated on runways which are free of such abrasives.

As the number of accumulated engine cycles for the particular engine approaches the number of accumulated engine cycles at which EGT margin would be expected to drop to zero, the actual EGT margin, based on actual EGT, is compared to the EGT margin predicted by the schedule, to determine whether actual EGT margin is deteriorating more or less rapidly than predicted. If the actual EGT margin is deteriorating faster than predicted, the minimum flow area may need to be increased at a scheduled maintenance prior to that predicted by the schedule. Conversely, if the actual EGT margin is deteriorating slower than predicted, the increase in minimum flow area may be delayed until a scheduled maintenance later than that predicted by the schedule.

As discussed above, the logic of the control system may be modified to automatically increase the minimum flow area of the modulating valve 5 when the actual EGT margin drops to zero. Since such an increase does not require mechanically altering the modulating valve 5 or removing the engine from service, the problem of coordinating the increase with a scheduled maintenance is eliminated. However, the predicted EGT margin schedule is still included in the logic of the control system as a check to prevent any increase in the minimum flow area prior to a minimum number of accumulated engine cycles. Such a check is necessary to prevent a failed EGT sensor, which is reading an erroneously high EGT, from causing the control system to prematurely shrink the turbine case, thereby causing interference or abrasion between the turbine blade tips and seals.

Once the EGT margin is restored by increasing the minimum flow area of the modulating valve 5, the restored EGT margin continues to deteriorate until the margin again reaches zero. Depending on the engine, it may be possible to further increase the minimum flow area of the modulating valve 5 at least once more between seal overhauls, using the method described above to again restore EGT margin. Of course, further increases in the minimum flow area of the modulating valve 5 are limited by the minimum operating flow area which may be requested by the control system during normal active clearance control operation, since increasing the minimum flow area in excess of the minimum operating flow area could cause excessive cooling air flow during active clearance control operation.

It should be apparent to those skilled in the art that by increasing the EGT margin, the turbine components will deteriorate at a significantly lower rate than if exposed to an EGT in excess of the maximum allowable EGT. The diversion of a portion of bypass fan air or other relatively cool gas from the engine incurs a cycle penalty, however the penalty is relatively small compared to the increase in the life of the turbine components. Although the method according to the present invention does not eliminate the need of the engine for periodic seal servicing and turbine blade repair or replacement, the method does extend the allowable time period between such events. It should be understood that, following a seal overhaul, the minimum flow area of the modulating valve 5 must be reset to that area which existed before any increases in flow area according to the present invention were made.

The present invention is thus well suited to obtain the objects and advantages as set forth above. It will be further appreciated that the method and means discussed above are not meant as being exhaustive of all potential embodiments of the method according to the present invention which is limited only by the scope of the claims presented hereinafter.

Although this invention has been shown and described with respect to detailed embodiments thereof, it ill be understood by those skilled in the art that various changes in form and detail thereof may be made without departing from the spirit and scope of the claimed invention.

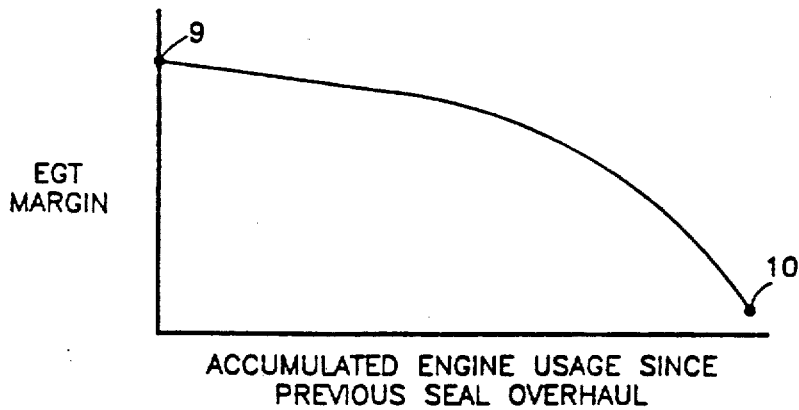

We claim:

1. A method of restoring exhaust gas temperature margin between consecutive periodic seal overhauls in a particular one of a plurality of substantially similar gas turbine engines, each of said gas turbine engines maintained by at least one scheduled interim maintenance operation between said consecutive periodic seal overhauls, said exhaust gas temperature margin being the difference between an exhaust gas temperature and a maximum allowable exhaust gas temperature, each of said plurality of engines having an active clearance control system for selectably reducing the clearance between a plurality of rotating blade tips and a surrounding annular seal, said control system including valve means, disposed adjacent a portion of the engine structure, for delivering a modulated gas flow, said gas flow having a temperature substantially different than the engine portion, and, control means, responsive to current engine operating conditions, for causing the valve means to modulate, modulating the flow rate of the delivered gas, wherein the method comprises the steps of:

determining, for said plurality of similar engines, an average accumulated engine usage and an average engine operating condition at which exhaust gas temperature margin reaches substantially zero;

determining, for said plurality of similar engines, an average minimum flow rate of said gas required to restore exhaust gas temperature margin to a desired exhaust gas temperature margin, the restored exhaust gas temperature margin being no more than an average exhaust gas temperature margin of said plurality of similar engines immediately following said seal overhauls;

determining a minimum valve flow area required to provide said average minimum flow rate at said average engine operating condition;

determining when the exhaust gas temperature margin of said particular one engine deteriorates to a preselected minimum; and, providing, in the valve means of the particular one engine, a valve flow area no less than said minimum valve flow area at all engine operating conditions.

2. The method as recited in claim 1, further comprising the step of:

coordinating the step of providing the flow area in the valve means of said particular one engine so as to coincide with said scheduled interim maintenance operation.

3. The method as recited in claim 2 wherein the step of providing the valve flow area in the valve means includes the step of:

physically altering the valve means to prevent reduction of the flow area to less than the minimum valve flow area.

4. The method as recited in claim 2 wherein the step of providing the flow area in said valve means includes the step of:

altering the control means to prevent said control means from reducing said valve means flow area to less than said minimum flow area.

5. The method as recited in claim 1 wherein the portion of the engine structure is an engine case, and the modulated gas is relatively cool with respect to the engine case.

6. The method as recited in claim 5, wherein the step of determining when the exhaust gas temperature margin of said particular one engine deteriorates to substantially zero comprises:

accruing particular accumulated engine usage of said particular one engine until said particular accumulated engine usage is substantially equal to said average accumulated engine usage.

7. The method as recited in claim 6, further comprising the step of:

coordinating the step of providing the flow area in the valve means of said particular one engine so as to coincide with said scheduled interim maintenance operation.

8. The method as recited in claim 7 wherein the step of providing the flow area in said valve means includes the step of:

physically altering the valve means to prevent reduction of the flow area to less than said minimum flow area.

9. The method as recited in claim 7 wherein the step of providing the flow area in said valve means includes the step of:

altering the control means to prevent said control means from reducing said valve means flow area to less than said minimum flow area.

10. The method as recited in claim 5, wherein the step of determining when the exhaust gas temperature margin of said particular one engine deteriorates to substantially zero comprises:

monitoring actual exhaust gas temperature for said particular one engine until said actual exhaust gas temperature is no less than the maximum allowable exhaust gas temperature.

11. The method as recited in claim 10 wherein the step of providing the flow area in said valve means includes the step of:

physically altering the valve means to prevent reduction of the flow area to less than said minimum flow area.

12. The method as recited in claim 10 wherein the step of providing the flow area in said valve means includes the step of:

altering the control means to prevent said control means from reducing said valve means flow area to less than said minimum flow area.

13. The method as recited in claim 5, wherein the step of determining when the exhaust gas temperature margin of said particular one engine deteriorates to substantially zero comprises:

accruing particular accumulated engine usage of said particular one engine until said particular accumulated engine usage exceeds said average accumulated engine usage; and, monitoring actual exhaust gas temperature for said particular one engine until said actual exhaust gas temperature is no less than the maximum allowable exhaust gas temperature;

14. The method as recited in claim 13 wherein the step of providing the flow area in said valve means includes the step of:

physically altering the valve means to prevent reduction of the flow area to less than said minimum flow area.

15. The method as recited in claim 13 wherein the step of providing the flow area in said valve means includes the step of:

altering the control means to prevent said control means from reducing said valve means flow area to less than said minimum flow area.

* * * * *

UNITED STATES PATENT AND TRADEMARK OFFICE
CERTIFICATE OF CORRECTION

PATENT NO. : 5,081,830

DATED : Jan. 21, 1992

INVENTOR(S) : Schwarz et al

It is certified that error appears in the above-identified patent and that said Letters Patent is hereby corrected as shown below:

The title page should be deleted to appear as per attached page.

Signed and Sealed this

Nineteenth Day of January, 1993

*Attest:*

DOUGLAS B. COMER

*Attesting Officer*   *Acting Commissioner of Patents and Trademarks*

United States Patent [19]

Schwarz et al.

[11] Patent Number: 5,081,830
[45] Date of Patent: Jan. 21, 1992

[54] METHOD OF RESTORING EXHAUST GAS TEMPERATURE MARGIN IN A GAS TURBINE ENGINE

[75] Inventors: Frederick M. Schwarz; Clifton J. Crawley, Jr., both of Glastonbury; Anthony F. Rauseo, Middletown; Andrew P. Boursy, Marlborough, all of Conn.

[73] Assignee: United Technologies Corporation, Hartford, Conn.

[21] Appl. No.: 529,088

[22] Filed: May 25, 1990

[51] Int. Cl.5 .............................................. F02C 7/12
[52] U.S. Cl. .................................. 60/39.02; 60/39.75
[58] Field of Search ............... 60/39.02, 39.24, 39.29, 60/39.75, 204; 415/115, 116, 175, 178

[56] References Cited

U.S. PATENT DOCUMENTS

| | | | |
|---|---|---|---|
| 4,019,320 | 4/1977 | Redinger et al. | 60/226.1 |
| 4,069,662 | 1/1978 | Redinger et al. | 60/226.1 |
| 4,304,093 | 12/1981 | Schulze | 60/39.29 |
| 4,849,895 | 7/1989 | Kervistin | 60/39.75 |
| 4,856,272 | 8/1989 | Putman et al. | 60/39.02 |
| 4,999,991 | 3/1991 | Haddad et al. | 60/39.02 |

Primary Examiner—Louis J. Casaregola

[57] ABSTRACT

The present invention discloses a method of restoring exhaust gas temperature (EGT) margin in a gas turbine engine equipped with a modulating valve and other hardware for shrinking the turbine case relative to the turbine rotors. The method involves increasing the minimum flow area of the modulating valve at all engine operating conditions after the engine experiences some wear and operational deterioration, thereby providing additional cooling flow at take-off and climb conditions to restore both turbine efficiency and EGT margin.

15 Claims, 1 Drawing Sheet